(Model.)
J. P. NOLAN.
INSTRUMENT FOR MEASURING DISTANCES.
No. 305,626.  Patented Sept. 23, 1884.
2 Sheets—Sheet 1.
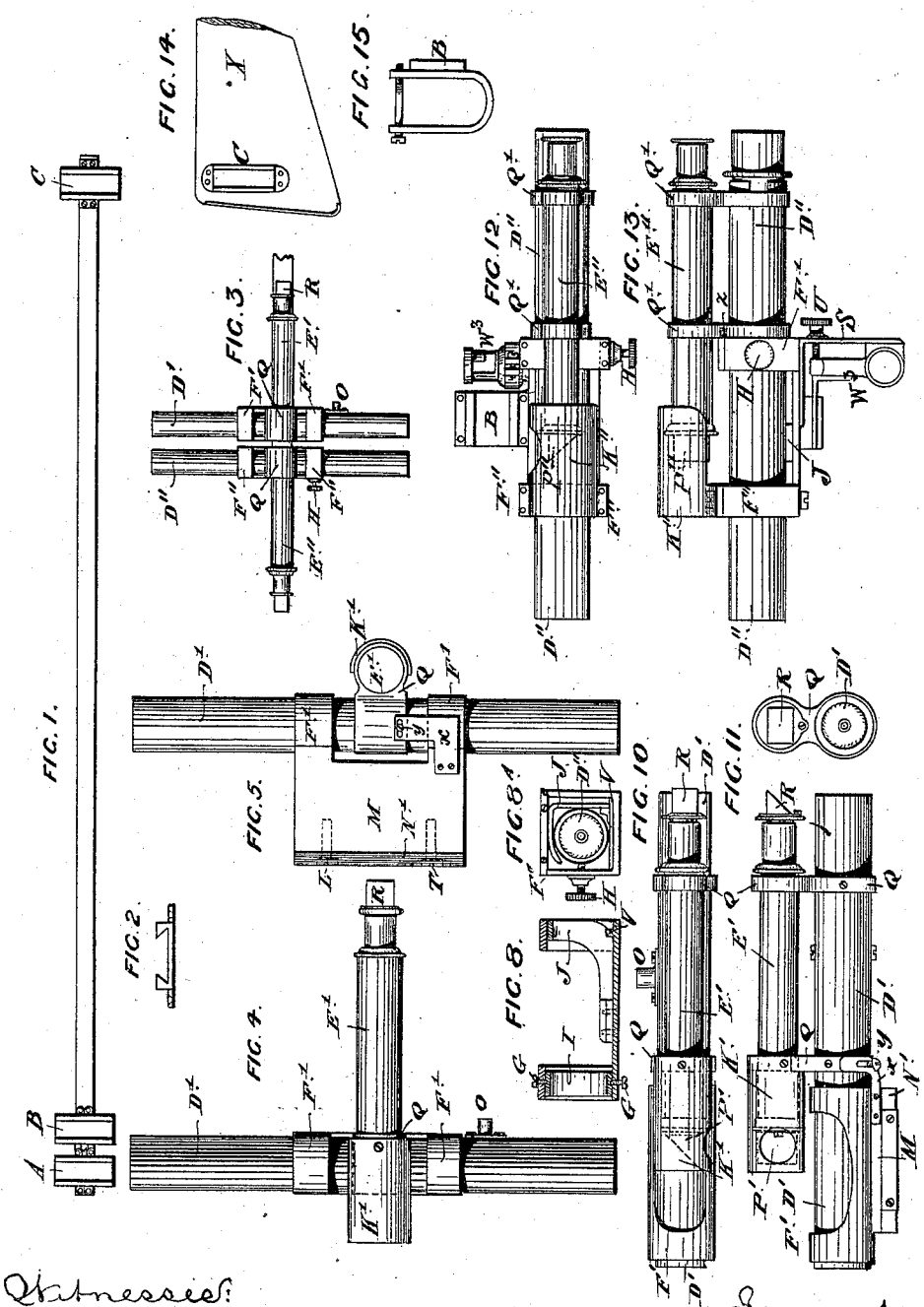

(Model.)
J. P. NOLAN.
INSTRUMENT FOR MEASURING DISTANCES.
No. 305,626. Patented Sept. 23, 1884.
2 Sheets—Sheet 2.
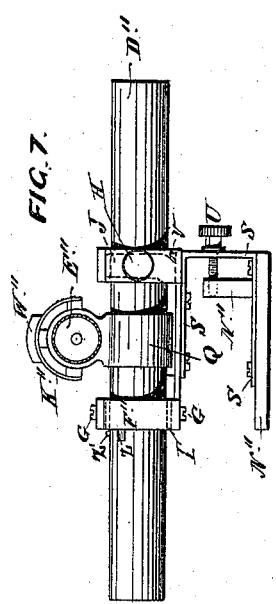
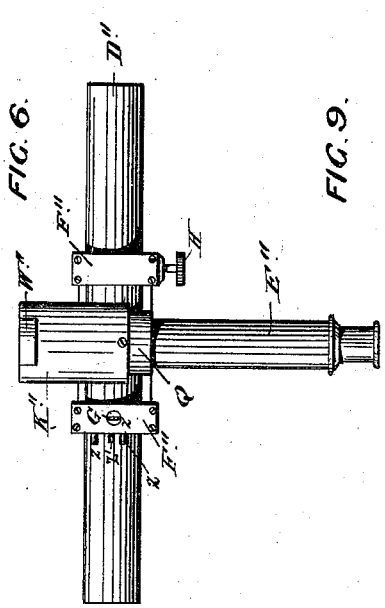
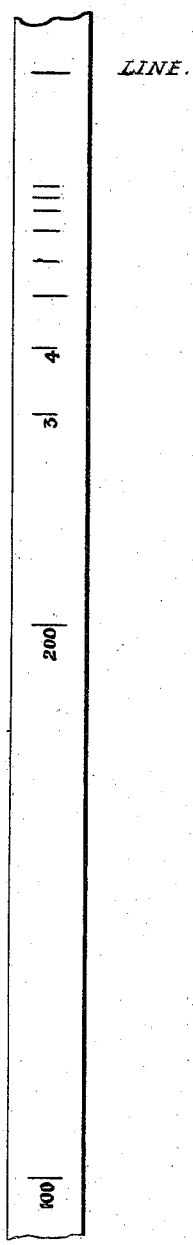
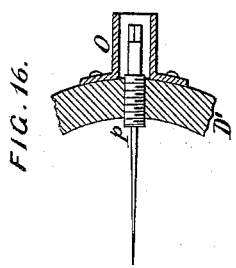
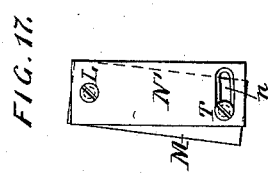

United States Patent Office.

JOHN PHILIP NOLAN, OF BALLINDERRY TUAM, COUNTY OF GALWAY, IRELAND.

INSTRUMENT FOR MEASURING DISTANCES.

SPECIFICATION forming part of Letters Patent No. 305,626, dated September 23, 1884.

Application filed October 14, 1882. (Model.) Patented in England March 17, 1882, No. 1,309.

*To all whom it may concern:*

Be it known that I, JOHN PHILIP NOLAN, a subject of the Queen of Great Britain and Ireland, and residing at Ballinderry Tuam, county of Galway, Ireland, have invented certain Improvements in the Instruments Used in Measuring Distances, (for which I have obtained a patent in Great Britain, No. 1,309, dated the 17th day of March, 1882,) of which the following is a specification.

The object of my invention is to construct an improved measuring-instrument for the more speedy and convenient measurement of distances, such an instrument as is required for military, civil engineering, marine, and other similar operations.

The main feature of my invention consists in the combination, with twin telescopic fittings, or half-instruments, of a testing-base so small that it cannot be of real use for observations, the said base being for the purpose of testing the correctness and accuracy of the instruments.

My invention further consists of improvements in the construction of the instruments and attachments, as hereinafter fully described.

In the accompanying drawings, Figure 1 is a view of the testing-base. Fig. 2 is an end view of an attachment drawn to a larger scale. Fig. 3 is a plan view of the twin instruments as arranged on the base for testing and correcting purposes. Figs. 4 and 5 represent, respectively, a plan and end view drawn to a larger scale of the "pointing" instrument. Figs. 6 and 7 are similar views of the "reading" instrument. Figs. 8 and 8ᴬ are detached sectional views of the gripping device for the sighting-telescope. Fig. 9 represents a special scale (greatly enlarged) for the sighting-telescope of the reading-instrument. Figs. 10 to 13 illustrate modified constructions of the instruments. Figs. 14 and 15 illustrate slide boxes or fittings to be employed when a rifle is employed as the testing-base. Fig. 16 is an enlarged view of an adjustable needle-point for one of the telescopes, and Fig. 17 is a view of the tongue and block carrying one of the instruments.

The testing-base shown in Fig. 1 is in the form of a rod or tube, provided with three dovetailed slide-boxes, A, B, and C, to receive corresponding tongues or feet, N' and N", on the twin instruments. This testing-base may be attached permanently to the regular base, or may be capable of attachment to it by the same slide or other device by which one of the telescopic instruments is attached to the support; or it may be adapted for independent attachment to the base.

The slide-boxes A ᴮ C may be of any convenient construction; or, if desired, other devices may be substituted to receive the twin instruments and fix them to the testing-base. While two of the boxes, A and C, are far apart—that is, at either end of the optical base—two, A and B, are close together. Two fittings only might be used, if one were movable, so that it could be made to approach the other, or two such fittings might be made fixtures, and a third be made detachable; or an extra small base might be provided with two such fittings.

The three boxes, as first described and shown, are the best plan of furnishing the desired small base, to be used for testing purposes only. The small base may be usefully an exact and determined fraction (as one twenty-fifth) of the larger. This is, however, not absolutely necessary. Of the two half or twin instruments one is used for pointing at the object the distance of which is to be ascertained or measured, and the other is used for reading such distance.

The first half-instrument above referred to I call the "pointer." It is composed of a telescope, D', preferably an erecting "refracting" telescope, to which is rigidly attached, at right angles thereto, another telescope, E', preferably an inverting-instrument. I call the former the "sighting" and the latter the "aligning" telescope, although such telescopes as the latter are often called "collimating" telescopes. These two telescopes may be attached together by a piece of metal, Q Q, (see Figs. 4 and 5,) in which two cylindrical holes have been bored at right angles to each other, so as to fit the tubing of the telescopes.

The sighting-telescope of the pointer should contain in its focus cross-wires or a pointed pin or filament of metal placed horizontally, with the point at or about the center of the field. Provision should be made to give a fine horizontal movement of adjustment to such cross-wires, pin, or filament. Where a pin or needle point is used, the adjustment may be effected by adapting the threaded body of the needle-holder p, Fig. 16, to a threaded opening in the case, and providing it with a squared end for the reception of a turning-key, which squared head is protected by a guard, O.

The aligning telescope should be inverting, and contain something fine and distinguishable in its focus—for example, slanting or diagonal cross-wires, like an X, or a thin metal plate, covering half the field, and placed in the focus, with a fine notch in the center thereof, are effective contrivances. It is a great advantage to fasten this aligning-telescope (as also that of the "reader") to its sighting-telescope, close to the object-glass end of the aligning-telescope, so that the axis of the two sighting-telescopes can be approached very closely for testing purposes. A shield of thin metal, K', is placed over the front of the aligning-telescope as a guard and sun-shade. It also may carry a weight to counterpoise the eye-piece end of the aligning-telescope, so that the system balances round the axis of the sighting-telescope. The sighting-telescope is surrounded for a portion of its length by a tube, F' F', or by two short tubes, in which it can be rotated a little for occasional adjustment. The tube F' F' is attached by brazing or otherwise to a block of metal, M, as shown in Fig. 5. The block is attached to the tongue of metal N' N' through the intervention of a pivot-screw, L, and clamping-screw T, both screws being conveniently countersunk in the said tongue-piece. The screw T passes through a slot, n, in the tongue N', Fig. 17, so that the pointer can be occasionally moved a little to the right and left on its tongue N', according to requirements, and then, by tightening the said screw T or both the above-mentioned screws, it can be retained or fixed in any desired position. A strip of metal, x, is firmly attached to F', and can be clamped by the screw y to Q, Fig. 5, play being allowed for this screw, so that the sighting-telescope can be rotated for about five degrees in F'; or, by tightening, the screw can be firmly clamped to F'. On the eye-cup of the aligning-telescope E' is placed a right-angled prism, R, which can at will be brought over the eye-piece aperture or pushed out of the way. In the former position it will give the sky as a background to the wires of the aligning-telescope of the pointer, when looked at through the aligning-telescope of the reader. In the latter position it permits of the aligning-telescope being looked through. The reader half-instrument (see Figs. 6 and 7) is made up of two telescopes, preferably inverting, with means for adjustment and of attachment to the base.

The advantage of employing inverting-telescopes for the reader, with erecting-telescopes for the pointer, is that the inverting-telescope is shorter and brighter; but it is impossible to point swiftly by hand with it, as the view is reversed. With the described combination the brightness and shortness are retained where most wanted—that is, in the telescope with the scale—while the advantage of the erecting eye-piece is also obtained where most required. The sighting-telescope D'' of the reader is contained in a tubular frame-work, F''', in which it has a little rotary play, and also a very fine and easy horizontal play or adjustment. The two adjustments, or the double play, are obtained by gripping the sighting-telescope in front by the ring I, and in the rear by the bent spring J, by the little rounded bar V, and by the screw H. The spring J presses the tube both on the top and the side. (See detail at Figs. 8 and 8ᴬ.) The ring I plays or works in gimbals G G. The sighting-telescope can be made to rotate by turning it by hand inside the said ring I and between the spring J, screw H, and rounded bar V. This rotary motion of the telescope-tube within the ring I is limited by a projection, z', coming into contact with pins z z on the ring, Fig. 6. The sighting-telescope can be moved finely and freely by the screw H to the right and left, this adjustment being frequently employed. The tubular frame-work F'' F''' is attached by screws to the broad rectangularly-bent spring S. This spring can be compressed or relieved by turning the screw U, which acts against a fulcrum formed by a projecting portion of the tongue N'' N'' coming up through a slot or hole in the said spring, the lower end of the spring being securely fastened to the said tongue. The screw U practically screws into a part or connection of N'', which has a screw-hole tapped in it, so that by turning the said screw the spring S will be bent or compressed and the tubular frame F'' and telescope carried by it tilted, and the axis of the telescope D'', if not in true position, can thus be brought into the same optical plane with the axis of the telescope D'. N'' is furnished with a side spring to retain it firmly in its slide-box.

The aligning-telescope E'' of the reader is furnished with perpendicular and horizontal cross-wires, as before explained. The aligning-telescope E'' is fastened to the sighting-telescope as in the pointer, but in the reverse direction. A shield, K'', similar to K' of the pointer, with a counterpoise, W'', is also provided. The shield K'' should, however, be either much larger or smaller than K', so that in testing one case may fit inside the other, and permit of the axes of D' and D'' being brought close to each other.

The sighting-telescope D'' of the reader has in its focus a special scale, Fig. 9, placed horizontally. The scale is engraved or otherwise inscribed on glass or some other substance usually employed for such purposes, and consists of a line, called the "infinity" line, and of other lines drawn at distances apart inversely proportional to certain selected distances—such as one hundred, two hundred, three hundred yards—and directly proportional to the length of the base and to the focal length of the reader sighting-telescope containing the said scale. By way of example, I give the distances on the scale from the infinity-line for lines to represent one hundred yards to one thousand yards, for a base of four feet and a focal length of ten inches:

100 yards' line is = $\frac{1}{7.5}$ inches from the infinity-line.
200 " " = $\frac{1}{15}$ " " " " "
300 " " = $\frac{1}{22.5}$ " " " " "
400 " " = $\frac{1}{30}$ " " " " "
500 " " = $\frac{1}{37.5}$ " " " " "
600 " " = $\frac{1}{45}$ " " " " "
700 " " = $\frac{1}{52.5}$ " " " " "
800 " " = $\frac{1}{60}$ " " " " "
900 " " = $\frac{1}{67.5}$ " " " " "
1000 " " = $\frac{1}{75}$ " " " " "

Instead of this or a similar scale, other micrometrical contrivances might be used, but I prefer to employ the former.

A modification in the construction and arrangement of these instruments may be made for the sake of convenience and portability. Optically such modifications are slightly inferior, as there is some loss of light and additional complication. These modified arrangements are illustrated at Figs. 10 to 13 of the drawings. The modification consists in providing both the aligning-telescopes with prisms P' P", placed in front of the object-glasses, as shown. These prisms are contained in the usual flanged metal prism-boxes, which are to be secured to the ends of the telescopes in front of the object-glasses. When the said prisms P' P" are so placed, the tubing of the aligning-telescopes E' E" will run along or be parallel with the sighting-telescopes D' D", to which E' E" are attached by rings Q Q'. Nevertheless the aligning and sighting telescopes will be optically at right angles—that is, the axis of the sight of the aligning-telescopes will still be at right angles to the sighting-telescopes D' D"—as the prisms will bend the rays of light entering the object-glasses of the former, of which the prisms now form an essential part, and the wires of the pointer aligning-telescope can be seen through the reader aligning-telescope. In this case the guards K' K" are transferred to the position, as shown, no counterpoise being necessary in this arrangement.

This invention is especially applicable to the use of a rifle as a base. When this is the case, a slide-box, C, Fig. 14, is attached to the stock X on the right side, or that away from the firer. The true position for the box is found by fitting the reader to the muzzle of the rifle, and then placing the pointer in the box and seeing that when the box is in its true position the two instruments, or rather the axes of D' and D", are parallel and at the intended distance apart.

Other similar fittings, instead of a slide-box, might be used, or the pointer might be affixed by a clamp and so attached at will to the stock; but the last-mentioned plan is cumbersome and inconvenient.

In the reader half-instrument I make the following modification: Instead of fastening the spring S to a tongue, I fasten it to a bayonet-socket, W³, making the screw enter into the top or shank of the socket, which serves for the fulcrum, Figs 12 and 13. The bayonet-socket may be of any kind usually employed, but should fit well and accurately. If the rifle should not be quite the desired length, a shallow false piece of wood may be added between the wood of the stock and the heel-plate. A small slide-box, B, Fig. 15, should be provided for gripping the rifle by means of a cut or bent ring and screws near the muzzle, so as to furnish a small base for testing purposes. Instead of this arrangement, a small slide-box may be fitted for the same purpose to the bayonet socket, to which the reader is attached, as shown in Fig. 12. It should be ascertained by trial that when the pointer is in the slide-box then the axis of the sighting-telescope of the pointer will be approximately parallel to that of the reader when the aligning-telescopes are directed on each other. If this is found not to be the case, the fit of the slide-box should be altered until a rough parallelism is obtained. True parallelism can only be attained by the use of the reader-adjustments. The reader half-instrument may also be fitted to a bayonet or rod with a bayonet-socket; but fitting it near the muzzle is best.

I will now briefly describe the manner in which the instrument would be used. The instruments should be tested to commence with. The reader is for this purpose placed in the slide-box A, the pointer in that of B. A point is chosen in the distance, which ought to be ten miles distant if A is about a foot from B; but if A is so near C that the axes of the sighting-telescopes are under two inches apart two miles will generally be far enough, and even one mile if very accurate testing is not necessary. The instruments are now, by means of their adjustments, brought so that, looking through the aligning or collimating telescopes of the reader, the wires of the two aligning-telescopes will appear to touch—that is, with the axes in line. It should be noted that a slight error of vertical adjustment is of little consequence in well-made instruments; but the lateral or horizontal adjustment should be accurate. I use the word "horizontal" all through this my specification in only a general sense, exact leveling not being usually required with these instruments. The sighting-telescopes are brought into the same plane by the screw U. Then the infinity-line of the scale is brought on a point of the distant object by moving the base with the instruments. Then the cross-wires or the point of the pin or filament, or whatever other optical object is in the focus of the sighting-telescope, is brought on the same point of the object by means of the lateral adjustment. As moving one of the adjustments may derange others, it should be carefully noted that at the end of the operation the wires of the aligning-telescopes should appear to touch truly, and also that the infinity-line of the reader and the wires of the pointer sighting-telescopes should be on the same distant point. On first testing it is probable that the horizontal adjustment of the pointer on N' and also its rotating adjustment in the tube F' will have to be used; but when the first testing has been effected the screws L, T, and y are tightened, and the reader-adjustments alone are generally sufficient for any further delicate adjustment. The adjustments of the pointer are only occasionally used in cases of accidents or to meet little errors of workmanship. To take a distance, the pointer is removed to C and the wires of the sighting-telescope of the pointer are brought on the distant point by moving the base and whole system. Then the scale of the reading-telescope is brought, by the screw U, on the point to get the axes of the sighting-telescopes in the same plane, and the wires of the aligning-telescopes are brought on each other. Then the wires of the pointer, being still on the distant point, that point will be seen on the scale of the reader touching a line representing a given distance, or between two lines at an apparent distance from each in true proportion to the real distance of the point from the observer. If the true distance be eight hundred and sixty yards, then the point will appear between the eight-hundred and nine-hundred lines, but about one-tenth nearer to the nine-hundred line. The result should be correct, (and indeed is found to be so,) because the base has been made straight by the aligning-telescopes, and because the infinity-line of the reader's scale is now parallel to the point of the pointer's needle, and because the eight-hundred and the nine-hundred lines have been drawn on the scale, as previously described, at distances inversely proportional to eight hundred and nine hundred yards and directly proportional to the length of the base and the focal length of the reader-telescope in yards.

In the above operation the adjustment of the pointer is seldom required, except the first time the instrument is employed or after an accident, while the vertical adjustment of the reader obtained by rotating it in F" is also not often used. During "testing and distance taking" the base may be rested on almost any support, and the pointing done by hand. Elaborate stands of various kinds may also, if desired, be used, fitted or not with rotating gear or with suitable known arrangements for holding the base.

In the above descriptions I have supposed the pointer to be on the right of the base and the reader on the left. The instruments may, however, be manufactured to fit in the reverse manner.

Mirrors may be employed instead of the prisms described, but the latter I find preferable.

The sighting-telescopes may have a double concave glass between the eye-piece and the object-glass, in which case the focal length of the reader sighting-telescope will, in calculating the scale, be taken as that of the corresponding simple or ordinary telescope—that is, a simple refracting-telescope of the same magnifying-power (with the same eye-piece) as is possessed by the telescope of which the magnifying-power is increased by the concave glass.

The sighting-telescopes should be focused for a long distance—say two miles—or for an infinite distance.

The aligning-telescopes should be focused for an infinite distance. This focusing should be permanently retained by fastening by screws the drawers to the body of the telescope or otherwise.

The aligning or collimating telescopes should be carefully tried before this fastening, to see that the wires of the pointer aligning telescope can be distinctly seen from that of the reader, when the object-glasses optically face each other, with or without the intervention of prisms.

I claim as my invention—

1. The combination of reading and sighting telescopes with a testing-base smaller than that used for observations, and having two or more boxes for the reception of the telescope-support, substantially as described.

2. The combination of the reading and sighting telescope of a distance-measuring instrument with a testing-base smaller than that used for observations, and having three boxes, A, B, and C, for the telescopes, two close together and the third at a considerable distance away from the other, as and for the purpose set forth.

3. The combination of a testing-base for a distance-measuring instrument, the said base being smaller than that used for observations, with a sighting and a reading telescope, and an aligning-telescope secured to each of the others at optical right angles thereto, the two aligning-telescopes optically facing each other, substantially as set forth.

4. The combination of a base with two telescopes attached thereto, one of said telescopes having an approximately horizontal scale in its focus, and means, substantially as described, for insuring the parallelism of the two telescopes.

5. The combination of a testing-base, with two telescopes attachable thereto, one having in its focus an approximately horizontal scale, with an infinity-line and degrees, as described, and means, substantially as set forth, for placing the axes of the two telescopes in the same plane.

6. The combination of a base and sighting and reading telescopes with a bent spring, S, to which one of said telescopes is attached, and an adjusting-screw for said spring, as and for the purpose set forth.

7. The combination of a block, M, and frame F' with a telescope, D', piece Q, strip x, and set-screw, substantially as described.

8. The combination of an erecting sighting-telescope in the pointing portion of a distance-measuring instrument, with an inverting sighting-telescope in the reader, substantially as herein described.

In testimony whereof I have signed my name to this specification in the presence of two subscribing witnesses.

JOHN PHILIP NOLAN.

Witnesses:
P. S. KNOTT,
*Mary St., Galway,*
JOHN MURPHY,
*Eyre Square, Galway.*